United States Patent [19]

Vihl

[11] 4,166,942
[45] Sep. 4, 1979

[54] REINFORCING WELDS FOR FLUID CONDUIT WRAPPING FOR VESSELS

[76] Inventor: Bernhard Vihl, 2 Glenwood St., Clifton, N.J. 07011

[21] Appl. No.: 888,920

[22] Filed: Mar. 22, 1978

[51] Int. Cl.$^2$ ............................................. B23K 31/02
[52] U.S. Cl. .............................. 219/137 R; 219/59.1; 285/286; 165/81; 165/169; 228/171
[58] Field of Search .............. 165/163, 168, 170, 169, 165/81; 29/477, 157 R, 157.3 AH, 157.3 D, 157.3 H, 157.3 V; 219/137 R, 59.1, 60 A; 228/171, 183, 170; 285/286

[56] References Cited

U.S. PATENT DOCUMENTS

| | | | |
|---|---|---|---|
| 1,700,319 | 1/1929 | Kjekstad | 285/286 |
| 1,853,549 | 4/1932 | Clark | 29/157 R X |
| 2,184,534 | 12/1939 | Smith et al. | 219/137 R |
| 2,604,569 | 7/1952 | Denneen | 228/171 |
| 2,650,801 | 9/1953 | Collito | 165/169 X |
| 3,318,376 | 5/1967 | Vihl | 165/169 |
| 3,366,557 | 8/1967 | Flaming | 228/171 |
| 3,535,767 | 10/1970 | Doherty, Jr. et al. | 228/171 |
| 3,712,372 | 1/1973 | Tranel | 165/170 |
| 3,912,151 | 10/1975 | Martin et al. | 228/171 |

Primary Examiner—C. L. Albritton
Assistant Examiner—M. Paschall
Attorney, Agent, or Firm—Richard L. Cannaday

[57] ABSTRACT

This invention pertains to heat transfer fluid conduit wrapping for vessels particularly as shown in U.S. Pat. Nos. 3,318,376 issued May 9, 1967 and 3,452,568 issued July 1, 1969. In those patents is shown wrapping which is specially contoured to provide outwardly extending flare edges on each side of a generally rounded, central portion. That wrapping is fabricated in determined lengths, and is made a fluid conducting passageway by welding its edges to a vessel wall and by welding one end to the adjacent end of a succeeding length. Welding of wrapping either at its edges or ends may be by one or more passes. The welding of one segmental wrapping length to the next length may, according to the present invention, include a specially shaped inner reinforcing member, and a transverse cut or an angled cut of twenty to forty-five degrees at the end of the wrapping may be made. The welded joint of succeeding wrapping lengths preferably includes a specially shaped additional outer reinforcing and stress distributing member welded to the wrapping at the angled cut or at a transverse or straight-across cut.

7 Claims, 15 Drawing Figures

REINFORCING WELDS FOR FLUID CONDUIT WRAPPING FOR VESSELS

BACKGROUND OF THE INVENTION

1. Field of the Invention

With reference to the fields of art established in the United States Patent and Trademark Office to which this invention pertains, attention is invited to the general class titled "Electric Heating" (Class 219) and more particularly to the subclass thereunder titled, "welding-process" (subclass 137R). Also of interest in that class is the subclass titled "cylinders-helical seam" (subclass 62) and "container" (subclass 64). Also of interest is the class titled "Heat Exchanger" (Class 165) and the subclass "conduit within or conforming to panel or wall structure—wall forms enclosure" (subclass 169).

2. Description of the Prior Art

The use of heat and cold in the processing of compositions, chemicals, plastics and the like is well known. Many of these processing operations are performed in vessels having either inner or outer conduit wrapping or both. Vessels having such conduit wrapping are shown in my U.S. Pat. No. 3,318,378 issued May 9, 1967. To the extent pertinent the disclosures of that patent and my U.S. Pat. No. 3,452,568 are incorporated by reference into the present Application.

In the processing of compounds vessels which have auxiliary heating and cooling systems are often used. Such heating with present processing may utilize steam up to 750 p.s.i. and then with rapid cooling the temperature in the compound may be brought to the low teens Farenheit. The heating and cooling cycle causes an expansion and contraction particularly in the wrapping welded in place on the walls of the vessels and also welded to itself. The rapid change in temperature is usually greater in the wrapping than in main vessel or container and often causes cracks to develop in the welds. Those cracks, of course, must or at least should be repaired before high pressure steam or pressurized fluid can be or is continued to be directed to flow in the wrapping.

The present invention is directed toward the reinforcement of the end-to-end joints of succeeding lengths of wrapping on a vessel. These reinforcements are applicable to either transverse or angled cut wrapping.

Three patents were noted and broadly pertain to the idea presented in this Application. U.S. Pat. No. 1,700,319 to KJEKSTAD issued Jan. 29, 1929, shows an exterior wrapping for a conduit construction and as an exterior or an auxiliary wrapping reinforces the joint of the pipe or conduit either seamless or lap welded. That wrapping is in the nature of a sleeve, and the joint is indicated as a transverse cut normally squared to the axis of the pipe. Also showing a reinforcement of a joint of a pipe is U.S. Pat. No. 1,853,549 to CLARK issued Apr. 12, 1932. That patent shows a serpentine lap piece added to the pipe at a transverse butt section of the pipe. A weld providing reinforcement to a sloped wall is shown in U.S. Pat. No. 3,842,237 to UJIIE issued Oct. 15, 1974, which indicates the desirability of making an inclined groove joint to attack walls of material together. The identified patents do not show or suggest any slanted cut in a wrapping such as is hereinafter more fully described. In these and any other prior art teachings known to me there is no showing of a slanted or beveled cut in the wrapping whereby the expansion or contraction from heating or cooling can be accommodated by that slanted cut at an end-to-end wrapping joint. An interior and exterior reinforcing of this joining helps spread the shock load over a larger portion of the applied wrapping of a vessel.

SUMMARY OF THE INVENTION

This invention may be summarized at least in part with reference to its objects.

It is an object of this invention to provide, and it does provide, a reinforcement of end-to-end weld joinings of the conduit wrappings of vessels.

It is a further object of this invention to provide, and it does provide, an exterior reinforcement of an end-to-end weld of the conduit wrapping on a vessel. This reinforcement is of oval outer configuration with an oval interior cutout. The reinforcement is curved-shaped to fit the contour of the wrapping.

This reinforcement is used with both a transverse and a slanted end cut of the conduit wrapping. It is bent and shaped to suit the outside of the wrapping. The reinforcement extends and reinforces the wrapping's resistance to heat and cold expansion and contraction on the weld joining of the wrapping segments or lengths in end-to-end relationship. This reinforcement also enables and assists the weld at this end-to-end joining of the wrapping segments to withstand rapid expansion and contraction with sudden changes of temperature. The diagonal or slanted or angled interfaces provided on the end-to-end joining of the wrapping also are used without exterior reinforcement to provide end-to-end weld joinings wherein situations of lower pressure and rapid temperature changes are present or anticipated.

At each end-to-end joining there is or at least may be placed, on the inside of the conduit wrapping, a short metal bridge member which assists in transmitting heat or cold from one wrapping segment to the next. An outer reinforcement may also be used and is of relatively thin stainless steel and curved generally to conform to the curvature of the wrapping elements. This outer reinforcement is tack welded in place and then heated and bent by pounding to conform to the wrapping including the weld at the end-to-end joining of succeeding wrapping lengths.

In addition to the above summary the following disclosure is detailed to insure adequacy and provide aid in understanding of the invention. This disclosure, however, without limitation of protective coverage, is not intended to present every possible variant of the invention as the same may later be disguised in form or additions of further improvements. For this reason there have been chosen specific embodiments of the formed conduit wrapping and reinforcements for the end-to-end joining of said wrapping as adopted for use with rapid expansion and contraction resulting from abrupt and extensive temperature changes, and showing a preferred means for applying an exterior reinforcement of this wrapping joining. These embodiments have been chosen for the purpose of illustration and description, and not of limitation, as shown in the accompanying drawings described briefly in the following section of this specification.

Figure 1:
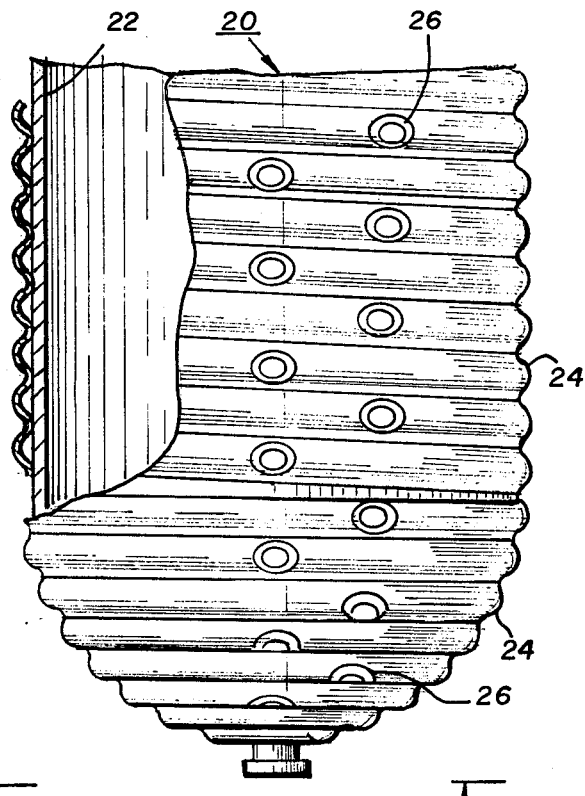
FIG. 1 presents a fragmentary side view of a vessel with exterior heat transfer fluid wrapping and with the main circumferential and bottom wrappings having reinforcing members at the end-to-end joinings of the segments of those wrappings; a portion of the side of the vessel is shown in section and broken away to indicate the general construction of a vessel with helical outer wrapping.

In the following description and in the claims various details are identified by specific names for convenience. Those names, however, are intended to be generic in their usage with corresponding reference numbers and characters referring to like members throughout the several Figures of the drawing.

The drawings disclose certain details of construction for the purpose of explanation but it should be understood that those structural details may be modified in various respects, and that the invention may be incorporated in particular structural forms other than those shown.

DESCRIPTION OF THE EMBODIMENTS OF FIGS. 1 THROUGH 5

Referring next to the drawings in detail and in particular to FIGS. 1 through 4, there is shown a vessel generally identified as 20. That vessel is similar in overall configuration to at least some of those shown in my abovementioned U.S. Pat. No. 3,318,376. The vessel has a side and bottom wall 22 on which, or to which, formed heat transfer fluid conduit wrapping 24 of a segmentwise continuous nature is attached in a pressure-tight manner as by welding.

At both the side and bottom portions of the vessel the wrapping segments are secured both at their edges and in an end-to-end relationship. Rapid heating and cooling of the wrapping, vessel and the contents of the vessel produce expansion and/or contraction effects placing great stresses on the joining welds of the wrapping, especially the end joining welds. Without reinforcement in such circumstances these end joining welds may develop cracks that permit leakage of steam or brine. An outer reinforcement member 26, when secured to the wrapping at these joined ends, often accommodates the expansion and contraction stresses and strains and prevents cracks in the joining welds.

Figure 3:
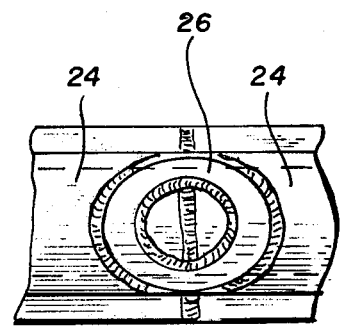
FIG. 3 presents a fragmentary side view, partly diagrammatic and in an enlarged scale, showing an end-to-end joining of the wrapping of FIG. 1 with a transverse weld and an outer reinforcement of the weld joining.

In FIG. 3 is shown an outer reinforcement member 26 used with an end joining in which the ends of the wrapping segments are cut substantially normal to the length of the wrapping 24. The member 26 extends the expansion and contraction forces on the conduit wrapping so that those forces are not completely concentrated at the weld, thereby reducing or eliminating crack flaws at the weld joining. The reinforcement member 26 of FIG. 3 is often used when a repair of a crack at an existing weld joint is made. This reinforcement can also be applied when the joint weld is made initially.

Figure 4:
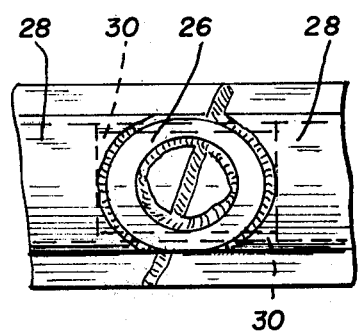
FIG. 4 presents a fragmentary side view, partly diagrammatic and in the enlarged scale of FIG. 3, showing an end-to-end joining of conduit wrapping segments with a slanted interface and weld, and with both an inner sleeve portion and an outer reinforcement of the weld joining.
Figure 2:
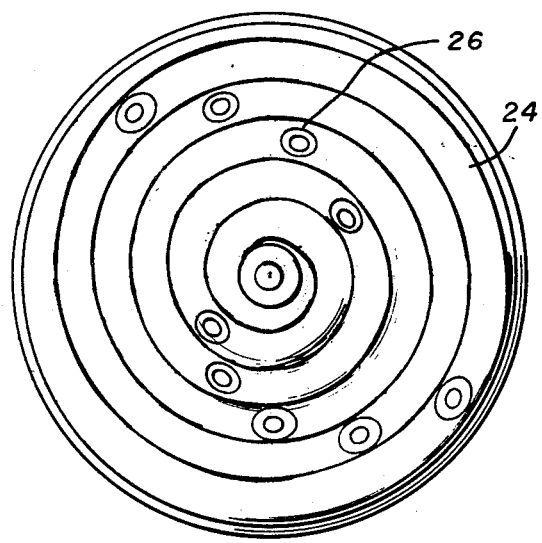
FIG. 2 presents a bottom view of the vessel of FIG. 1, this view taken on the line 2—2 of FIG. 1 looking in the direction of the arrows.
Figure 11:
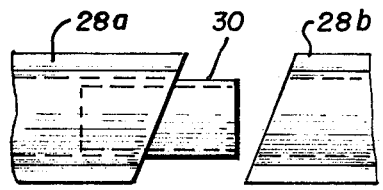
FIG. 11 presents a plan or face view of an about-to-be-made end-to-end joining, an arrangement of a slanted cut wrapping with a reinforcing internal member positioned under the weld joining.

In FIG. 4 the wrapping identified as 28 is contoured as if made by the apparatus of my abovementioned U.S. Pat. No. 3,452,568. The ends of this wrapping are cut at an angle or slant such as twenty-two and one-half degrees. One wrapping segment is secured to the wall of the vessel and into the open end and outwardly contoured portion of that segment there is placed an inner reinforcing portion 30. This inner member may be about ten gauge stainless steel and is formed in an arc and is preferably a tight fit into the protruding or outwardly extending trough portion of the wrapping. A mating and adjacent wrapping segment is then placed over this inner reinforcement. Reference is made to FIG. 11 as depicting this procedure. The inner reinforcement may be tack welded in place to the secured wrapping segment before the other, mating segment is placed in position. The joining weld is completed before the outer reinforcement is placed in position. The inner reinforcement portion 30 may be of any convenient length but preferably extends at least three quarters of an inch (19 mm.) out beyond the end weld joining of the wrapping. The inner reinforcement may be cut at a slant to conform to the slant of the wrapping end, if desired.

Figure 5:
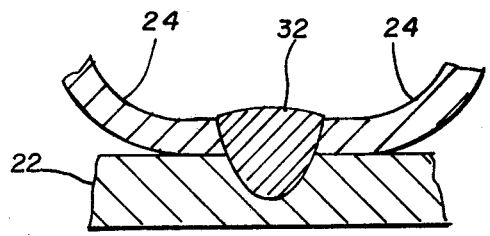
FIG. 5 presents a fragmentary sectional view taken longitudinally showing in an enlarged scale the adjacent wrapping welded to the wall of the vessel of FIG. 1.

In FIG. 5 is depicted a welding of the edges of the specially contoured wrapping to the wall of the vessel. In my reference U.S. Pat. No. 3,318,376 the weld usually employed to secure the wrapping to the vessel wall is effected by submerged arc. In the weld depicted in FIG. 5, the weld is two or more passes using the heliarc welding technique or method. The side or bottom wall 22 has overlying wrapping 24 secured thereto by one or more weld passes 32. Usually the wrapping which is of stainless steel about one-eighth of an inch (3.2 mm.) thick is tack welded in position and in adjacent position. This weld 32, when completed, secures the wrapping turns to the vessel wall and to each other in fluid-tight condition. The weld is made to suit the particular conditions and compositions of material of the wrapping and wall.

Figures 6, 7:
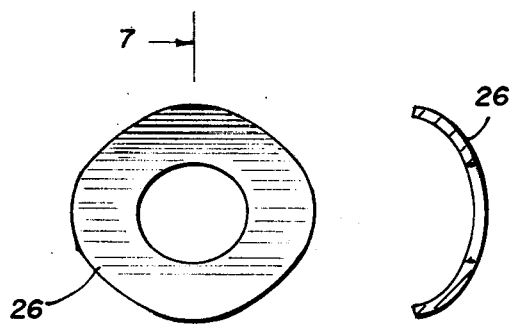
FIG. 6 presents a plan view of an exterior reinforcing member in its preferred configuration.
FIG. 7 presents a transverse sectional view of the reinforcing member of FIG. 6, this view taken on the line 7—7 of FIG. 6 looking in the direction of the arrows.

Outer Reinforcement of FIGS. 6 and 7

In FIGS. 6 and 7 the outer reinforcement member 26 is shown. That member is preferably of stainless steel of about ten gauge (3.3 mm.) in thickness and is cut by a die or other means from sheet material and then bent into an arc generally as seen in FIG. 7. It may also be a simple wire ring. In the reinforcement member shown, it is assumed that the wrapping is about three and seven-eighths inches (98.5 mm.) wide with a radius at the maximum height of the arc of approximately one and five-eighths inches (41.2 mm.). The flat size, before bending, of member 26 in width is approximately two and three-quarter inches (70 mm.). A length of approximately three and one-half inches (89 mm.) is provided and an interior ellipse of approximately one and one-half inches (38.1 mm.) by one and three-quarter inches (44.5 mm.) is also provided. This outer reinforcement is thus more-or-less a ring-like member which is ellipsoidal in shape. This member 26 is bent to an inside arc of approximately one and five eighths inches (41.2 mm.) so that it may later be attached by welding as described with reference to subsequent portions of the drawing.

It is to be noted that the outer reinforcement is curved and is sized to suit the size and configuration of a conduit wrapping. As hereinafter more fully described, this outer reinforcing member is curved to suit and snugly fit the arched or trough portion of the wrapping. It is preferred that the outer reinforcement 26 terminate width-wise short of the outward flaring edges of the wrapping. Desirably that reinforcement is at least three inches (76 mm.) in length so as to extend about one and one-half inches (38 mm.) on each side of the weld joining of the wrapping segments.

Figure 8:
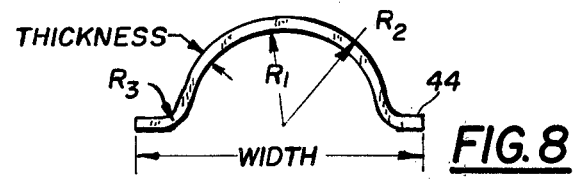
FIG. 8 presents a transverse sectional view of a typical wrapping particularly as capable of being produced by apparatus of the general kind shown in my U.S. Pat. No. 3,452,568.

Wrapping as Configured in FIG. 8

In FIG. 8 is depicted a typical conduit wrapping made of material approximately three-sixteenths of an inch (4.8 mm.) in thickness, and the strip is approximately five and one-quarter inches (133 mm.) wide before bending. When shaped to the desired transverse configuration as shown in FIG. 8, and as reduced to practice, the thickness of the material is approximately three-sixteenths to seven thirty-seconds of an inch (4.8 to 5.5 mm.) and the width of the wrapping when formed as in FIG. 8 on the line designated "width" therein is approximately three and seven-eighths inches (98.5 mm.). The inside radius of the wrapping forming the trough portion of the segment is identified as $R_1$ and is approximately one and thirteen thirty-seconds inches (35.6 mm.). The outside radius identified as $R_2$ is approximately one and five-eighths inches (41.3 mm.).

A radius $R_3$ is provided to change the trough portion of the wrapping to an outwardly extending edge portion 44 on each side. These outer edges extend about three-eighths to seven-sixteenths of an inch (9.5 to 11.1 mm.). The radius $R_3$ is usually and preferably about three times the thickness of the material forming the conduit wrapping.

Figure 9:
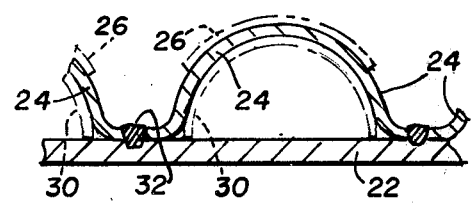
FIG. 9 presents a sectional view, partly diagrammatic, showing adjacent wrappings welded to the surface of a vessel and to each other with both interior and exterior reinforcements positioned on the wrapping.

Assembly of Wrapping to Wall as in FIG. 9

In FIG. 9 there is depicted a sectional view of the attachment of conduit wrapping 24 to the wall 22 of vessel 20. That wrapping is shown with the same configuration as that in FIG. 8. When attached to the wall of the vessel the end welding of one wrapping segment to the succeeding segment may include interior reinforcement 30 and an exterior reinforcement 26 at this joining weld to provide strong continuity of the fluid conduit. Weld passes 32 as in FIG. 5 may be two to two and one-half times the thickness of the wrapping 24 and penetration of the weld into the wall of the vessel is, of course, desired. In order to provide the full attachment of the wrappings to the wall which often is of stainless steel or other resistant metal a heli-arc weld is generally employed. A plural number of passes is usually provided for full attachment of the wrappings to the wall of the vessel and to each other.

Figure 10:
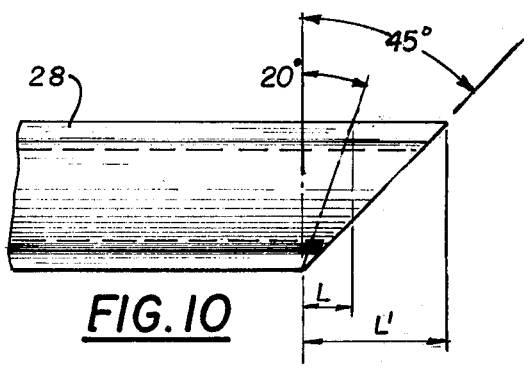
FIG. 10 presents a plan or face view of a slanted cut of the end of a wrapping segment depicting slanted cut angles from twenty to forty-five degrees.

Slanted Cut as Seen in FIG. 10

In FIG. 10 an end segment of conduit wrapping 28 is depicted as having a slanted cut. The wrapping may be cut at an angle of twenty degrees or may have a maximum slanted cut of forty-five degrees. Assuming a projected or formed width of wrapping in FIG. 8 of three and seven-eighths inches (98.5 mm.), the projected width of a twenty degree cut is about one-quarter inch (6.3 mm.) longer. A twenty-two and one-half degree cut, which is the preferable one, is approximately five-sixteenths inch (7.9 mm.) longer and a forty-five degree cut is approximately 1.93 inches (49 mm.) longer. It is apparent these lengths or increments is projected width are derived from calculations of a base length of 3.875 inches divided by the cosine of the concerned angle. The axial advance, or regression, along the slanted cut is represented by the dimension L for twenty degrees and L' for forty-five degrees. Assuming the same width of a wrapping 28 as above and using 3.875 inches times the tangent of the angle, for twenty degrees the distance L is equal to about 1.4 inches (35.5 mm.); for twenty-two and one-half degrees the distance is about 1.6 inches (40.6 mm.), and the distance L' for a forty-five degree cut is three and seven-eighths inches (98.5 mm.). This slanted cut will attenuate the stresses resulting from the rapid expansion and contraction of metal parts caused by the steam and/or brine or other heating or cooling fluid fed to the conduit wrapping in a rapid sequence which might otherwise set up a potential for cracks in the joining of the ends of the wrapping segments.

Slanted Cut and Interior Reinforcement as Seen in FIG. 11.

In FIG. 11 is shown a wrapping segment 28a having an angled cut end within which a rounded or trough-like inner reinforcing member 30 is positioned. That wrapping segment in the left-hand portion is contoured as in FIGS. 8 and 9 and is tack welded at its edges to, for example, an underlying vessel surface before the inner insertion reinforcement 30 is placed in position. This inner reinforcing element may be lightly tack welded into position so it will remain in place during end welding or it may simply be a snug fit within wrapping segment 28a. A mating right-hand conduit wrapping segment 28b having a correspondingly angled end cut is placed in position adjacent the left-hand segment 28a and overlying element 30 with a space between the wrapping segments 28a and 28b of sufficient extent to allow the desired end welding to be accomplished. That welding is contemplated to achieve substantial penetration into reinforcing member 30 on an angled line, at least in the example illustrated, across its outer, convex surface.

Assembly as Seen in FIGS. 12-15

Figure 12:
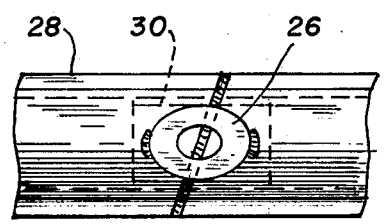
FIG. 12 presents a plan view showing wrapping segments joined along a slanted interface and with an outer reinforcement shown tack welded at its exterior outer ends thereupon.
Figure 13:
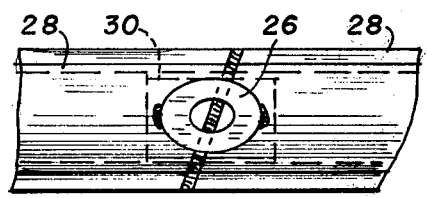
FIG. 13 presents the plan view of FIG. 12 with the outer reinforcement heated for shaping to the transverse configuration of the wrapping and the weld protrusion at the joining of the ends of the wrapping segments.
Figure 14:
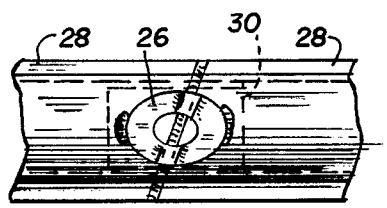
FIG. 14 presents the plan view of the reinforcement of FIG. 12 with the welding of the outer reinforcement to the wrapping below it partially completed.
Figure 15:
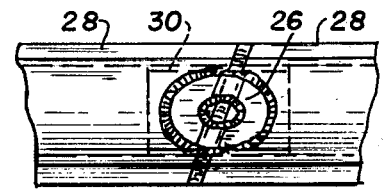
FIG. 15 presents the plan view of the reinforcement illustrated in FIG. 12 with continuous welding of that reinforcement to the wrapping shown around both its outer and inner edges.

In FIG. 12 it is assumed that a twenty-two and one-half degree slanted or beveled cut is provided on the wrapping segment ends. An insert 30, as shown, is provided to withstand high pressure. It is anticipated that the outside reinforcement 26 of FIGS. 6 and 7 is also to be applied. A tight fitting of that reinforcement, which may be ten gauge stainless steel, preferably begins with the ends of the reinforcement tack welded in place, as seen in FIG. 12. In FIG. 13, after the reinforcement ends are tack welded in place, it is anticipated that both the wrapping 28 and the exterior reinforcement will be heated to approximately seven hundred degrees Farenheit (371° C.) at which point the stainless steel outer reinforcement will become sufficiently malleable for shaping by small hammer blows to bring the outer reinforcement into a more-or-less contiguous relationship with the wrapping. In FIG. 14 is shown a reinforcement 26 of FIG. 13 which after being shaped to a contour accommodating the transverse slanted or angled weld is somewhat further welded to the wrapping 28. The reinforcement 26 is then still further welded to completely attach both its outside or external and its inside or internal edges to the underlying wrapping material as seen in FIG. 15.

This improvement in the end joining of conduit wrapping segments or sections either transverse cut, identified as 24, or slanted cut, identified as 28, is classified as follows: (a) transverse cut (normal to axis of wrapping) with an outer reinforcement oval member 26 and possibly including an inner reinforcement member 30; (b) slanted cut of wrapping ends at twenty to forty-five degrees; (c) slanted cut of wrapping with an inner reinforcement member 30, and (d) a slanted cut of wrapping with an outer reinforcement member 26 with or without an inner reinforcement member 30.

The improved end-to-end weld joining in any and all of the above-noted attached conduit wrapping arrangements provides a method and resulting product in which additional strength is supplied to the end joining to resist cracking of and at concerned welds as a result of rapid heating and cooling.

The outer reinforcement 26, when secured to the wrapping at the end joining, extends the forces of expansion and contraction for at least one and one-half inches (38 mm.) on each side of the joining weld. The angled cut also extends or distributes the expansion and contraction forces axially for about 1.4 inches at a twenty degree angle and a three and seven eights inch projected width wrapping, and for about 3.88 inches with a forty-five degree cut on the same width wrapping, as calculated in connection with FIG. 10.

The method disclosed provides an improved end-to-end weld joining of a wrapping attached to a vessel wall to furnish a heat transfer fluid conduit, the attached wrapping being in the form of a trough having a rounded central portion and outwardly curved flaring edge portions. It includes the step of providing a transverse cut at an end of a wrapping segment and a substantially similar mating cut on the adjacent end of a succeeding wrapping segment. This cut may be normal to the axis of the wrapping or it may be angled from twenty to forty-five degrees thereto. The method further includes the steps of arranging an essentially parallel-sided spacing or groove between adjacent cut ends of succeeding wrapping segments and welding the wrapping segments together at this groove to provide a continuous joining suitable for a fluid conduit.

The slanted or angled cut and/or an outer reinforcement which is of strip metal provides a spreading of the contracting and expanding forces as heating and cooling liquids, vapors and/or gases are subsequently and sequentially fed through the heat transfer fluid conduit. Where an outer reinforcement is used there is additionally provided the step of forming from strip or plate metal said reinforcement which is ovoid in outer configuration and has an inner aperture therethrough and providing therewith a ring-like member which is curved to suit the outer radius of the rounded central portion of the attached wrapping and attaching this outer reinforcement by welding at both the outer and inner edges of the reinforcement, this reinforcement being substantially centered at the weld joining and being of a width which is less than the rounded central portion of a wrapping so that this outer reinforcement does not engage an outward edge portion.

Terms such as "left", "right", "up", "down", "bottom", "top", "front", "back", "in", "out" and the like are applicable to the embodiments shown and described in conjunction with the drawings pertaining to the end joining of succeeding conduit wrapping segments. These terms are used simply for convenience of description in particular circumstances and do not to any limiting extent control the position or attitude in which the disclosed wrapping or any vessel equipped with it may be constructed or used, either with or without any reinforcement, whether internal or external or both, at the wrapping segment joints. Protection by Letters Patent of this invention in all its aspects as the same are set forth in the appended claims is sought to the broadest extent that the prior art allows.

I claim as my invention:

1. An end-to-end weld joining of succeeding segments of a wrapping attached to a vessel wall to provide a heat transfer fluid conduit, the attached wrapping being configured transversely as a trough having a rounded central portion and outwardly curved edge portions and said joining being characterized by (1) a slanted end cut at an end of a given wrapping segment and a slanted, mating cut at the adjacent end of the succeeding wrapping segment, that slanted cut being from twenty to forty-five degrees to a plane transverse to the axis of the wrapping, (2) a substantially uniform spacing between the adjacent slanted cut ends of said wrapping segments and a welding together of those segments thereat to obtain a continuous fluid-tight joining with the slanted end interface and the joining providing a spreading of the expansion and contraction forces as heating and cooling fluids are fed sequentially through the fluid conduit, and (3) a metal outer reinforcement member ovoid in outer configuration with a throughgoing aperture furnishing a ring-like appearance curved to suit the outer radius of the rounded central portion of the conduit wrapping, further being substantially centered at said slanted end interface and of a width less than that of said rounded central portion thereby avoiding engagement with either of said outerwardly curved edge portions, and being attached to said wrapping as by welding around both its, said outer reinforcement's, inner and outer peripheries.

2. A method for weld joining of succeeding segments of a wrapping attached to a vessel wall to provide a heat transfer fluid conduit, the attached wrapping being configured transversely as a trough having a rounded central portion and outwardly curved edge portions, said method including the steps of (1) forming a slanted cut at the end of a given wrapping segment and a slanted, mating cut at the adjacent end of the succeeding wrapping segment, that cut being from twenty to forty-five degrees to a plane transverse to the axis of the wrapping; (2) effecting a substantially uniform spacing between the adjacent slanted cut ends of said wrapping setments; (3) welding those segments together at said spacing to obtain a continuous fluid-tight joining with the slanted end interface and the joining providing a spreading of the expansion and contraction forces as heating and cooling fluids are fed sequentially through the fluid conduit, and (4) providing an outer reinforcement by (i) cuttig a metal member to an ovoid configuration with a through-going aperture to furnish a ring-like appearance; (ii) curving that member to suit the rounded central portion of the conduit wrapping, the member being of a width less than that of said rounded central portion thereby avoiding engagement with either of said outwardly curved edge portions; (iii) substantially centering that member as a reinforcement at the end joining weld, and (iv) attaching that member to the conduit wrapping as by welding around both its, said outer reinforcement's, inner and outer peripheries.

3. The end-to-end weld joining of claim 1 in which there is provided an inner reinforcement at the weld, that reinforcement being a metal member transversely curved to be a snug fit at the inner radius of the rounded central portion of the conduit wrapping and having a length sufficient to extend at least three quarters of an inch (19 mm.) each side of the weld joining.

4. The end-to-end weld joining of claim 1 in which said outer reinforcement is of sheet metal having a thickness no greater than that of the conduit wrapping to which it is attached and a length of at least three inches (76 mm.).

5. The end-to-end weld joining of claim 4 in which said outer reinforcement is attached initially only at its ends to the adjacent wrapping segments and, after such partial attachment, is heated sufficiently for shaping by hammer blows to bring it into a substantially contiguous relationship with the rounded central portion of the wrapping including the weld joining the wrapping segments at their slanted end interface.

6. The method of claim 2 in which there is additionally provided an inner reinforcement at the end joining weld and which includes the steps of curving a metal member transversely to be a snug fit at the inner radius of the central rounded portion of the conduit wrapping and cutting that member to a length sufficient to extend at least three quarters of an inch (19 mm.) on each side of the weld joining.

7. The method of claim 2 in which said outer reinforcement member is attached initially only at its ends to the adjacent wrapping segments and which includes the steps of heating that member and hammering it to bring it into a substantially contiguous relationship with the rounded central portion of the conduit wrapping including the end weld joining of the wrapping segments.

* * * * *